(12) United States Patent
Han

(10) Patent No.: US 9,045,258 B2
(45) Date of Patent: Jun. 2, 2015

(54) PACK

(76) Inventor: Jeong Sik Han, Bucheon-si (KR)

( * ) Notice: Subject to any disclaimer, the term of this patent is extended or adjusted under 35 U.S.C. 154(b) by 137 days.

(21) Appl. No.: 13/703,241

(22) PCT Filed: Apr. 4, 2011

(86) PCT No.: PCT/KR2011/002306
§ 371 (c)(1),
(2), (4) Date: Jan. 11, 2013

(87) PCT Pub. No.: WO2011/155694
PCT Pub. Date: Dec. 15, 2011

(65) Prior Publication Data
US 2013/0101238 A1    Apr. 25, 2013

(30) Foreign Application Priority Data
Jun. 11, 2010  (KR) .................. 10-2010-0055616

(51) Int. Cl.
*B65D 30/24* (2006.01)
*B65D 30/26* (2006.01)
*B65D 33/01* (2006.01)
*B65D 33/16* (2006.01)
*F16K 25/00* (2006.01)
*F16K 15/14* (2006.01)
*B65D 51/18* (2006.01)
*B65D 75/58* (2006.01)
*B65D 47/20* (2006.01)
*B65D 47/36* (2006.01)

(52) U.S. Cl.
CPC .............. *B65D 33/16* (2013.01); *F16K 15/144* (2013.01); *B65D 51/18* (2013.01); *B65D 75/5877* (2013.01); *B65D 47/2062* (2013.01); *B65D 47/36* (2013.01)

(58) Field of Classification Search
CPC .................... B65D 81/2038; B65D 77/225
USPC ................. 383/44, 45, 103, 80; 251/170
See application file for complete search history.

(56) References Cited

U.S. PATENT DOCUMENTS

| 5,332,095 | A | * | 7/1994 | Wu | 206/524.8 |
| 5,354,133 | A | * | 10/1994 | Rapparini | 383/103 |
| 5,882,119 | A | * | 3/1999 | Fadal, II | 383/80 |
| 5,893,461 | A | * | 4/1999 | Walters | 206/524.8 |
| 6,056,439 | A | * | 5/2000 | Graham | 383/103 |
| 6,089,271 | A | * | 7/2000 | Tani | 137/854 |
| 6,477,743 | B1 | | 11/2002 | Gross et al. | |
| 6,575,191 | B2 | * | 6/2003 | Skeens et al. | 137/512.15 |
| 6,604,634 | B2 | * | 8/2003 | Su | 206/524.8 |

(Continued)

FOREIGN PATENT DOCUMENTS

| JP | 2005-500207 A | 1/2005 |
| JP | 2008-505030 A | 2/2008 |

(Continued)

*Primary Examiner* — Jes F Pascua
*Assistant Examiner* — Derek Battisti
(74) *Attorney, Agent, or Firm* — Birch, Stewart, Kolasch & Birch, LLP

(57) ABSTRACT

Disclosed is a pack. The pack includes a pack body in which fluid is receivable, a plug affixed to an inner surface of the pack body, a portion of the plug being configured to protrude outward from the pack body, the plug having a discharge opening perforated therein, a lid located at one side of the plug to close the discharge opening, and an elastic member located at one side of the plug to impart elasticity to the lid in a direction of closing the discharge opening.

2 Claims, 8 Drawing Sheets

(56) References Cited

U.S. PATENT DOCUMENTS

| | | | |
|---|---|---|---|
| 6,712,334 B2 * | 3/2004 | Motonaka et al. | 251/149.6 |
| 7,232,108 B2 * | 6/2007 | Motonaka et al. | 251/100 |
| 8,075,189 B2 * | 12/2011 | Berman | 383/202 |
| 2007/0014492 A1 * | 1/2007 | Chen | 383/103 |
| 2011/0216990 A1 * | 9/2011 | Lin | 383/103 |

FOREIGN PATENT DOCUMENTS

| | | |
|---|---|---|
| KR | 1998-041252 U | 9/1998 |
| KR | 20-0369100 Y1 | 12/2004 |

* cited by examiner

PACK

TECHNICAL FIELD

The present invention relates to a pack.

BACKGROUND ART

Containers for mineral water used nowadays are reusable containers that are collected after use and are redistributed with fresh mineral water therein after washing.

Washing of the interior and exterior of these containers, however, requires wash water, and washing using chemicals for sterilization causes generation of secondary pollutants. Moreover, since steam or hot water used for washing the interior of the container is directly ejected to an inner surface of the container, melting of the container or generation of toxic substances may occur.

In addition, leakage of water and invasion of pollutants into the container due to deterioration in air-tightness between a container and a lid may occur, and thus factors harmful to sanitation may be encountered.

Typically, the mineral water container is typically used with a hot and cold water dispenser such that water within the mineral water container is fed to the hot and cold water dispenser while a constant pressure is maintained. To withstand such pressure, the mineral water container must be thick. This problematically increases the price of containers for mineral water.

DISCLOSURE

Technical Problem

It is an object of the present invention to provide a pack which can achieve reduction in price, solve problems caused by washing, and prevent invasion of pollutants.

Technical Solution

In accordance with an aspect of the present invention, there is provided a pack including a pack body in which fluid is receivable, a plug mounted to the pack body, the plug having a discharge opening that connects the interior of the pack body to the outside, a lid located within the pack body, the lid being configured to close the discharge opening, and an elastic member located within the pack body, the elastic member serving to impart elasticity to the lid to allow the lid to close the discharge opening.

The pack may further include a connector mounted to one side of the plug, the connector functioning to push the lid in a direction of opening the discharge opening and having a passage perforated therein.

The plug may include a plug body fixed within the pack body, a plurality of fixing pieces arranged on an edge of one surface of the plug body so as to be spaced apart from one another, the fixing pieces serving to secure the elastic member, and a coupling piece formed at the other surface of the plug body to protrude outward from the pack body.

The elastic member may include a fixing body secured to the fixing piece, the fixing body having a drain hole, a pressure piece located at the center of the drain hole, the pressure piece serving to press the lid toward the discharge opening, and a plurality of elastic ribs configured to connect the pressure piece and the fixing body to each other, the elastic ribs serving to impart elasticity to the pressure piece.

The connector may include a connector body separably coupled to the coupling piece, an inserting piece formed at one surface of the connector body, the inserting piece being inserted into the discharge opening to push the lid, thereby opening the discharge opening, and a connecting piece formed at the other surface of the connector body, the connecting piece being configured so as to be coupled to a drainage line, the passage may penetrate the interior of the inserting piece, the connector body, and the connecting piece, and the inserting piece may have at least one inlet hole formed in a periphery thereof so as to be in fluid communication with the passage.

The pack may further include a packing located between the inserting piece and a peripheral surface of the discharge opening.

The coupling piece may have a guide groove circumferentially formed in a portion of an outer peripheral surface thereof, the connector body may have a mount configured to be inserted into the guide groove, and the connector may be separably coupled to the plug as the mount is inserted into the guide groove.

The mount may include a mount body orthogonally formed at the connector body, and a guide protrusion orthogonally protruding from one surface of the mount body so as to be inserted into the guide groove.

The lid may be reduced in diameter from one side to the other side, and at least a portion of the discharge opening may correspond to the lid so as to come into contact with the lid.

In accordance with another aspect of the present invention, there is provided a pack including a pack body in which fluid is receivable, a plug affixed to an inner surface of the pack body, one side of the plug being configured to protrude outward from the pack body, the plug having a discharge opening perforated therein, a shield film mounted to the other side of the plug to close the discharge opening, and a connector mounted to one side of the plug, the connector serving to cut the shield film.

The plug may include a plug body fixed within the pack body, and a coupling piece formed at one surface of the plug body to protrude outward from the pack body.

The connector may include a connector body separably coupled to the coupling piece, an inserting piece formed at one surface of the connector body, the inserting piece being inserted into the discharge opening and serving to cut the shield film, a packing located between the inserting piece and a peripheral surface of the discharge opening, and a connecting piece formed at the other surface of the connector body, the connecting piece being configured so as to be coupled to a drainage line.

The coupling piece may have a guide groove circumferentially formed in a portion of an outer peripheral surface thereof, the connector body may have a mount configured to be inserted into the guide groove, and the connector may be separably coupled to the plug as the mount is inserted into the guide groove.

Advantageous Effects

According to the embodiments of the present invention, a lid is configured to come into close contact with a discharge opening by elasticity of an elastic member. This may prevent leakage of fluid received in a pack body as well as invasion of pollutants into the pack body, enabling provision of a sanitary pack.

Further, according to the embodiments of the present invention, as a result of fabricating the pack body as being disposable, it is possible to achieve a reduction in washing costs of the pack and to prevent environmental pollution due to detergents used to wash the pack.

Furthermore, according to the embodiments of the present invention, the disposable pack body is subjected to sterile processing, and thus the sanitary pack having no risk of growth of bacteria may be accomplished.

DESCRIPTION OF DRAWINGS

These and/or other aspects of the invention will become apparent and more readily appreciated from the following description of the embodiments, taken in conjunction with the accompanying drawings of which.

BEST MODE

Figure 1:
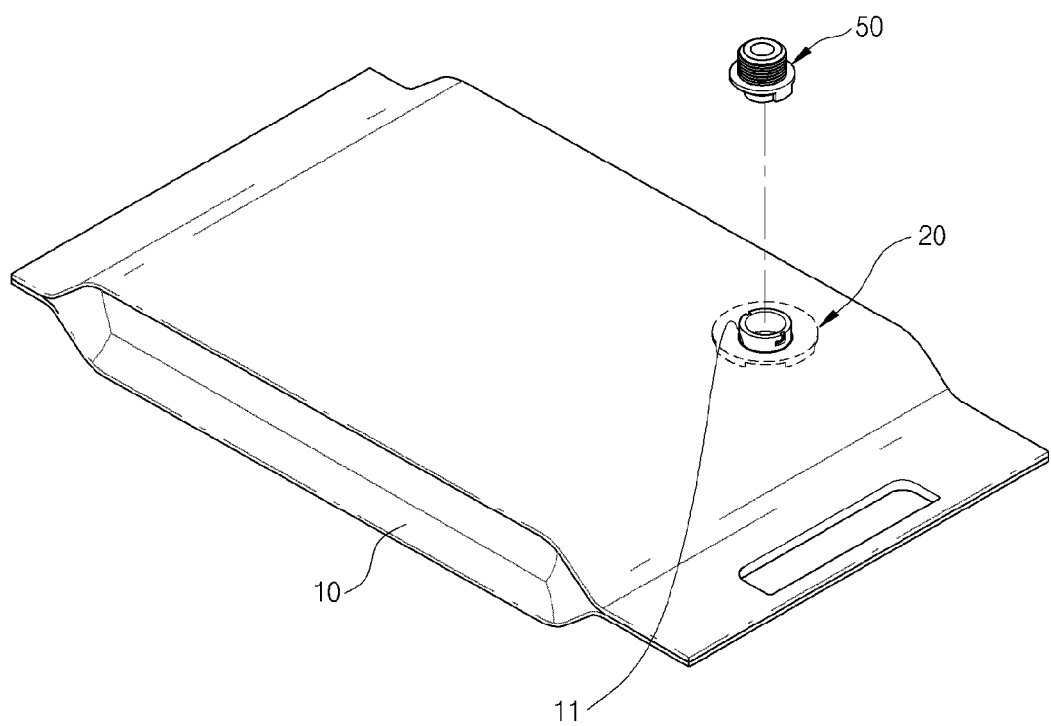
FIG. 1 is a perspective view illustrating a pack according to an embodiment of the present invention.

Hereinafter, reference will be made in detail to the exemplary embodiments of the present invention with reference to the accompanying drawings, to allow those skilled in the technical fields to which the invention pertains to easily implement the invention. However, it will be understood that the present invention may be realized in various forms and are not limited to the embodiments described herein. Like reference numerals refer to like elements throughout.

Now, a pack according to one embodiment of the present invention will be described with reference to FIGS. 1 to 4.

Figure 2:
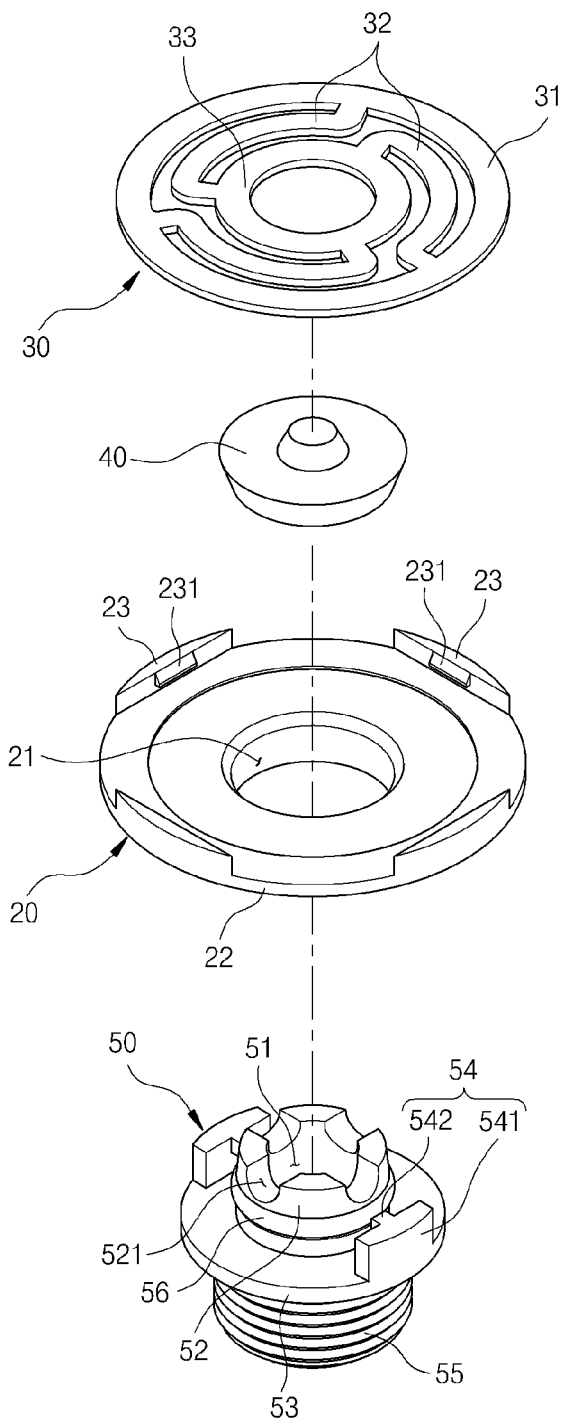
FIG. 2 is an exploded perspective view of the pack illustrated in FIG. 1.
Figure 3:
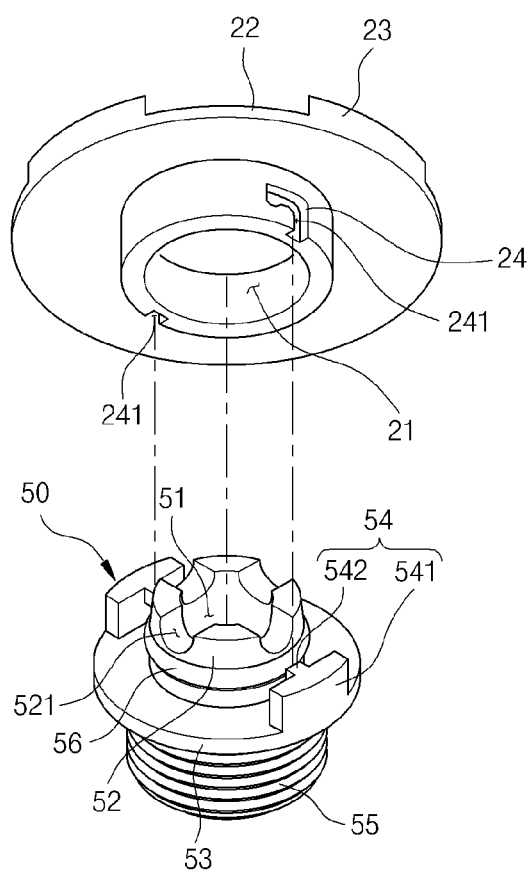
FIG. 3 is an exploded perspective view illustrating a coupling relationship between a plug and a connector illustrated in FIG. 2.
Figure 4:
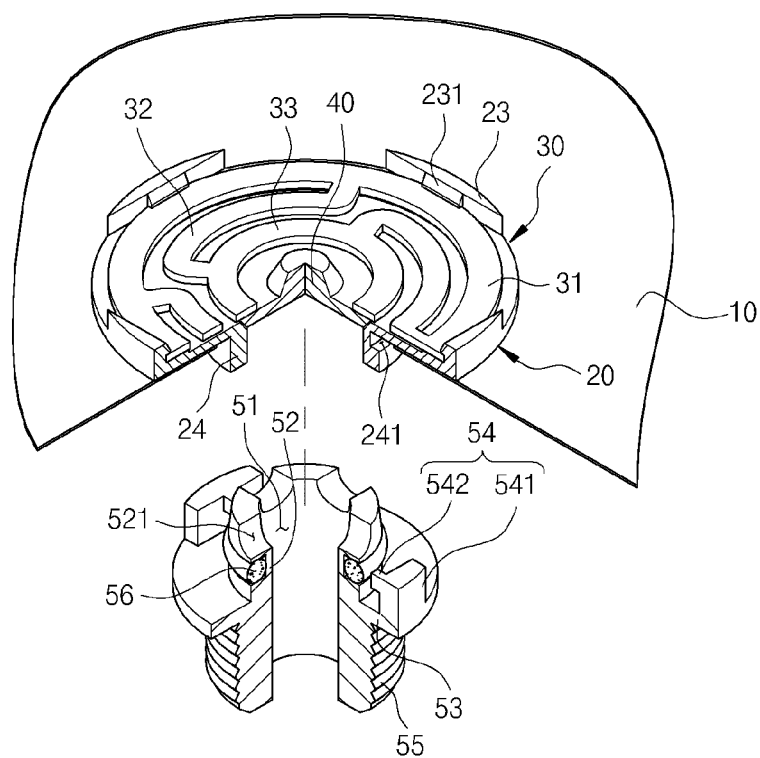
FIG. 4 is a semi-sectional perspective view illustrating main parts of the pack illustrated in FIG. 1.

FIG. 1 is a perspective view illustrating a pack according to an embodiment of the present invention, FIG. 2 is an exploded perspective view of the pack illustrated in FIG. 1, FIG. 3 is an exploded perspective view illustrating a coupling relationship between a plug and a connector illustrated in FIG. 2, and FIG. 4 is a semi-sectional perspective view illustrating main parts of the pack illustrated in FIG. 1.

Referring to FIGS. 1 to 4, the pack, designated by reference numeral 1, according to the present embodiment includes a pack body 10, a plug 20, a lid 40, an elastic member 30, and a connector 50.

The pack body 10 may be used to receive fluid therein. The pack body 10 may be formed of a thin plastic material. The interior of the pack body 10 may be subjected to sterile processing. As such, growth of bacteria in the pack body 10 may be prevented. The pack body 10 may be coated with a shield film (not shown) that blocks light. The shield film functions to prevent fluid from being spoiled by light. The pack body 10 has a mounting hole 11 to which the plug 20 is mounted.

The plug 20 includes a plug body 22, a plurality of fixing pieces 23, and a coupling piece 24. The plug 20 is also provided with a discharge opening 21 for entrance/exit of fluid. The discharge opening 21 is perforated in the center of the plug body 22 and the coupling piece 24.

The plug body 22 is affixed to an inner surface of the pack body 10. Alternatively, the plug body 22 may be affixed to an outer surface of the pack body 10. The plug body 22 may be subjected to sterile processing because of a fluid contact possibility thereof.

The plurality of fixing pieces 23 is arranged on an edge of one surface of the plug body 22 so as to be spaced apart from one another. The fixing pieces 23 extend perpendicular to the plug body 22. A holding wedge 231 is formed at a distal end of each fixing piece 23, for coupling of the elastic member 30.

The coupling piece 24 is formed at the other surface of the plug body 22 and protrudes outward from the pack body 10 through the mounting hole 11. The coupling piece 24 has guide grooves 241 circumferentially formed in an outer peripheral surface thereof. The guide grooves 241 have an L-shaped form. Alternatively, the guide grooves 241 may have a spiral form. Other forms of the guide grooves 241 are also possible.

The lid 40 is inserted into the pack body 10 to close the discharge opening 21. The lid 40 may be formed of rubber, for example. Thus, the lid 40 has strong elasticity and flexibility. The lid 40 is reduced in diameter from one side to the other side. A reduced diameter portion of the lid 40 may be fitted into the discharge opening 21. Once the lid 40 is fitted into the discharge opening 21, fluid received in the pack body 10 cannot be discharged outward through the discharge opening 21. On the contrary, there is no risk of introduction of pollutants into the pack body 10 through the discharge opening 21.

The elastic member 30 serves to impart elasticity to the lid 40, and includes a fixing body 31, a pressure piece 33, and a plurality of elastic ribs 32.

The fixing body 31 has a ring shape and comes into close contact with one surface of the plug body 22. The fixing body 31 in close contact with the surface of the plug body 22 is caught by the holding wedges 231 and is firmly secured to the plug body 22. A drain hole 311 is formed in a central region of the fixing body 31, for passage of fluid.

The pressure piece 33 is located at the center of the drain hole 311 to face the lid 40. The pressure piece 33 applies pressure to the lid 40 to assist the lid 40 in coming into close contact with an inner peripheral surface of the discharge opening 21. Alternatively, the pressure piece 33 may be integrally formed with the lid 40.

The plurality of elastic ribs 32 is circumferentially arranged in the drain hole 311. The elastic ribs 32 serve to connect the fixing body 31 and the pressure piece 33 to each other. The elastic ribs 32 impart elasticity to the pressure piece 33 to assist the pressure piece 33 in applying pressure to the lid 40. As such, the lid 40 may remain in close contact with the inner peripheral surface of the discharge opening 21 owing to the elasticity of the elastic ribs 32.

The connector 50 is coupled to the plug 20. The connector 50 serves as a spacer between the lid 40 and the discharge opening 21 such that the lid is separated from the inner peripheral surface of the discharge opening 21. The connector 50 has a passage 51 formed in a central region thereof to allow fluid to move through the passage 51 when the lid 40 is separated from the discharge opening 21. The connector 50 includes a connector body 53, an inserting piece 52, and a connecting piece 55.

The connector body 53 has a disc form, and a plurality of mounts 54 is arranged on one surface of the connector body 53 so as to be spaced apart from one another. Each mount 54 consists of a mount body 541 and a guide protrusion 542. The mount body 541 protrudes orthogonally from the connector body 53. Alternatively, the mount body 541 may take the form of a strip extending in a circumferential direction of the connector body 53. The guide protrusion 542 protrudes orthogonally from an inner surface of the mount body 541. The guide protrusion 542 may be inserted into the corresponding guide groove 241. Once the guide protrusion 542 is inserted into the guide groove 241, the connector body 53 is rotatable in a circumferential direction of the coupling piece 24. In this case, as the guide protrusion 542 is caught by a distal end of the guide groove 241, firm coupling between the connector body 53 and the coupling piece 24 may be accomplished.

The inserting piece 52 is formed at the center of one surface of the connector body 53. The inserting piece 52 may be inserted into the discharge opening 21 such that a tip thereof comes into contact with the lid 40 when the connector body 53 is coupled to the coupling piece 24. As such, the inserting piece 52 applies pressure to the lid 40 to open the discharge opening 21. The pressurized lid 40 simultaneously forces the elastic ribs 32, causing the elastic ribs 32 to be bent away from the discharge opening 21 and accumulate elasticity. Thereby, the elastic ribs 32 impart the elasticity to the lid 40 to assist the lid 40 in coming into close contact with the inner peripheral surface of the discharge opening 21 when the connector 50 is separated from the plug 20.

When the discharge opening 21 is opened, the fluid received in the pack body 10 may reach an outer peripheral surface of the inserting piece 52. In this case, to allow the fluid to be introduced into the passage 51, the inserting piece 52 has at least one inlet hole 521 in fluid communication with the passage 51.

A packing 56 is interposed between the outer peripheral surface of the inserting piece 52 and the inner peripheral surface of the discharge opening 21. The packing 56 serves to prevent the fluid received in the pack body 10 from leaking to between the inserting piece 52 and the inner peripheral surface of the discharge opening 21.

The connecting piece 55 is formed at the center of the other surface of the connector body 53. A drainage line 60 may be coupled to the connecting piece 55 to guide flow of fluid introduced into the passage 51.

Next, operation of the above described pack will be described with reference to FIGS. 5 and 6.

Figure 5:
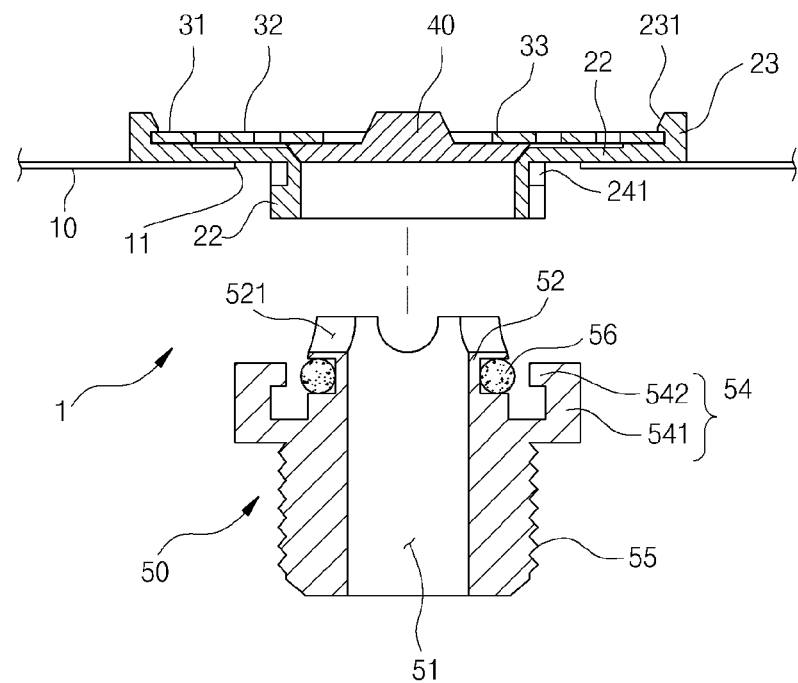
FIGS. 5 and 6 are views illustrating a procedure of coupling the connector to the plug when in use.
Figure 6:
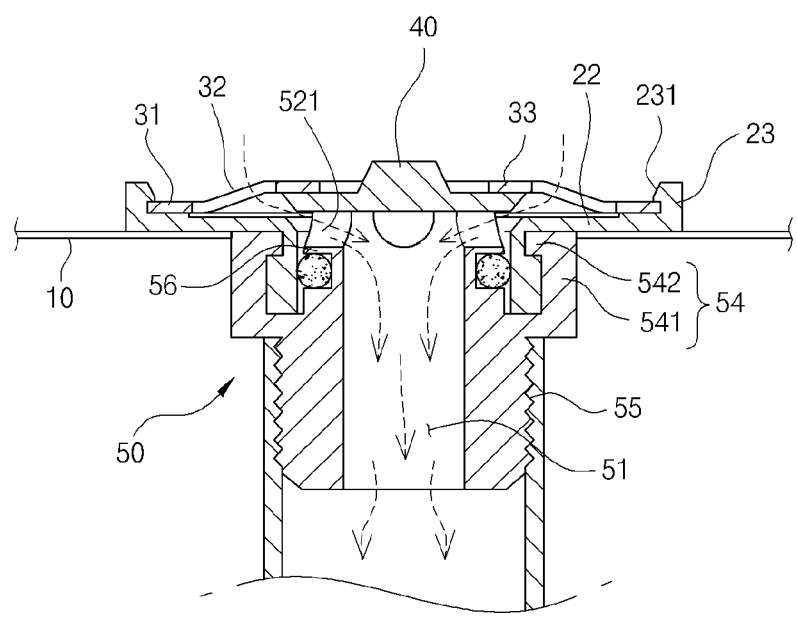

FIG. 5 illustrates a state immediately before the connector is coupled to the plug in sectional view, and FIG. 6 illustrates a state in which the connector applies pressure to the lid in sectional view.

First, referring to FIG. 5, the lid 40 remains pressurized by the pressure piece 33 under the influence of the elasticity of the elastic member 30. The pressurized lid 40 is in close contact with the inner peripheral surface of the discharge opening 21. As such, the discharge opening 21 is closed by the lid 40. More specifically, the lid 40, which is, for example, formed of rubber, is pressed against the inner peripheral surface of the discharge opening 21 by the elasticity of the elastic member 30 without a possibility of generation of a gap between the lid 40 and the inner peripheral surface of the discharge opening 21. This ensures complete closure of the discharge opening 21 and prevents leakage of the fluid received in the pack body 10.

Next, referring to FIG. 6, when attempting to rotate the connector body 53 of the connector 50 in a first direction after the guide protrusion 542 is inserted into the guide groove 241, the connector body 53 is rotated in the circumferential direction of the coupling piece 24 until the guide protrusion 542 is caught by and fixed to the distal end of the guide groove 241.

Simultaneously with rotation of the connector body 53 around the coupling piece 24, the tip of the inserting piece 52 comes into contact with the lid 40. The inserting piece 52 applies pressure to the lid 40 so as to move the lid 40 away from the discharge opening 21. Thereby, the pressurized lid 40 is separated from the inner peripheral surface of the discharge opening 21. In this case, the elastic member 30 accumulates elasticity that will be used to move the lid 21 to the discharge opening 21.

Once the lid 40 is separated from the discharge opening 21, the fluid received in the pack body 10 is introduced into the passage 51 through the inlet hole 521 to thereby move through the discharge line 60. On the contrary, the fluid may be injected into the pack body 10 once lid 40 is separated from the discharge opening 21.

During movement of the fluid received in the pack body 10, the packing 56 fitted to the outer peripheral surface of the inserting piece 52 prevents leakage of the fluid to between the inserting piece 52 and the inner peripheral surface of the discharge opening 21.

Meanwhile, when the connector 50 is separated from the plug 20, the lid 40 is moved to the discharge opening 21 by the elasticity of the elastic member 30. Thus, as the lid 40 comes into close contact with the inner peripheral surface of the discharge opening 21, the discharge opening 21 may again be closed.

Next, the pack according to another embodiment of the present invention will be described with reference to FIGS. 7 to 11.

Figure 7:
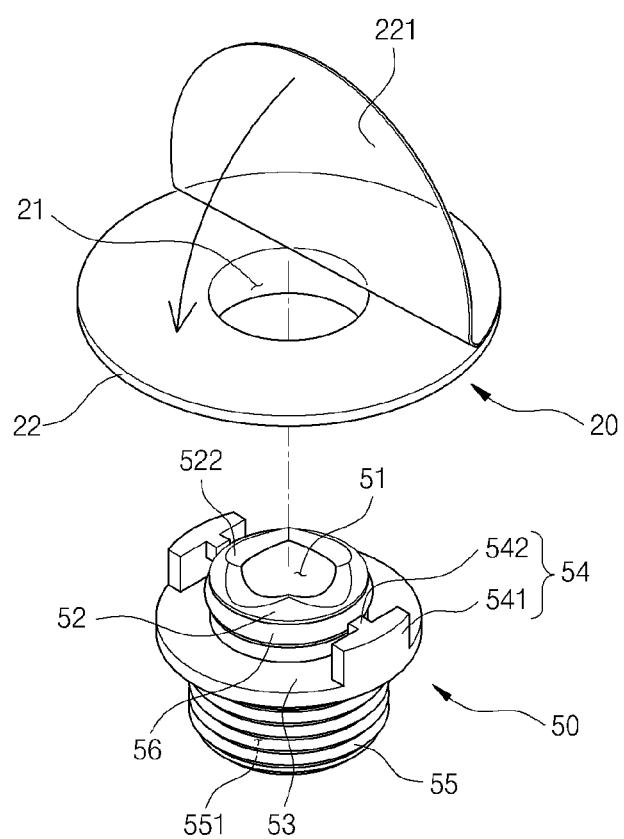
FIG. 7 is an exploded perspective view illustrating a pack according to another embodiment of the present invention.
Figure 8:
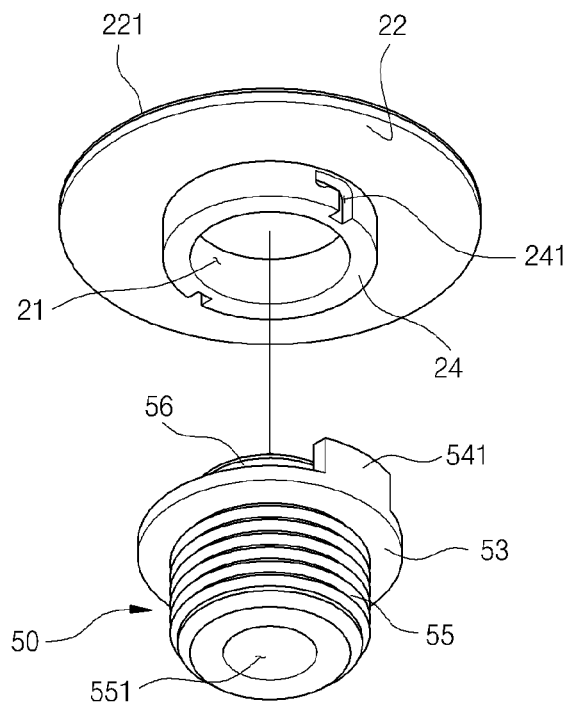
FIG. 8 is an exploded perspective view illustrating a coupling relationship between a plug and a connector illustrated in FIG. 7.
Figure 9:
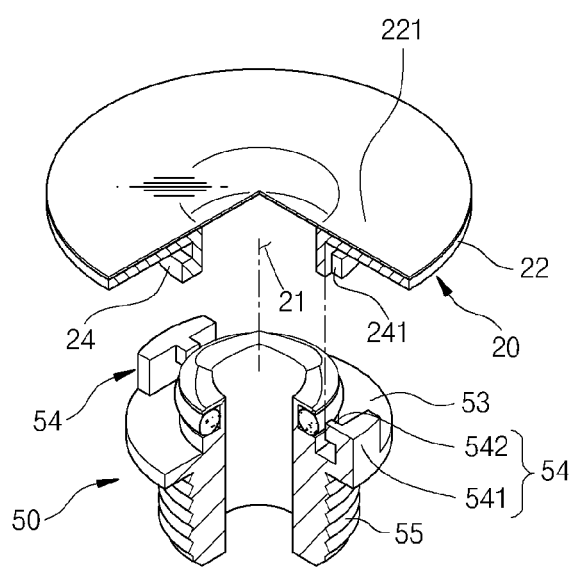
FIG. 9 is a semi-sectional perspective view illustrating main parts of the pack illustrated in FIG. 7.
Figure 10:
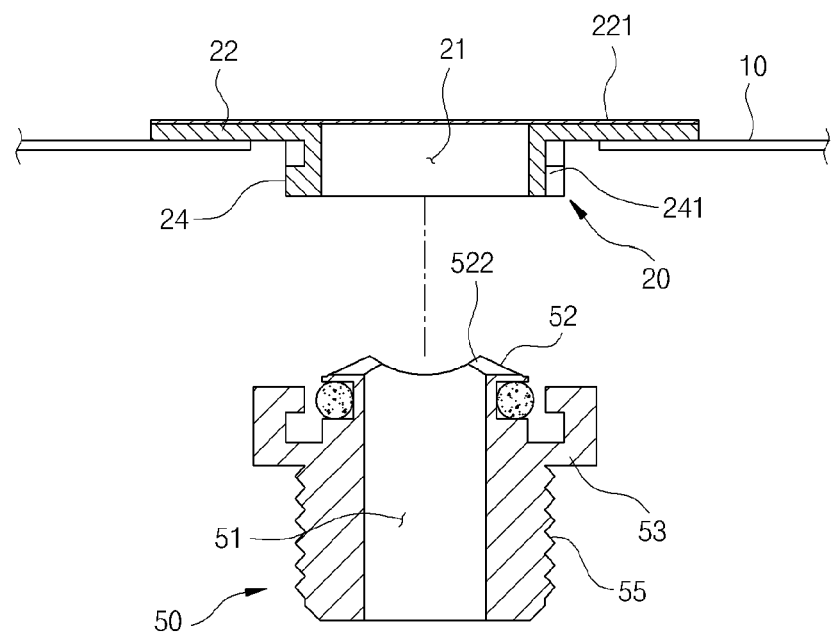
FIGS. 10 and 11 are views illustrating a procedure of coupling the connector to the plug when in use.
Figure 11:
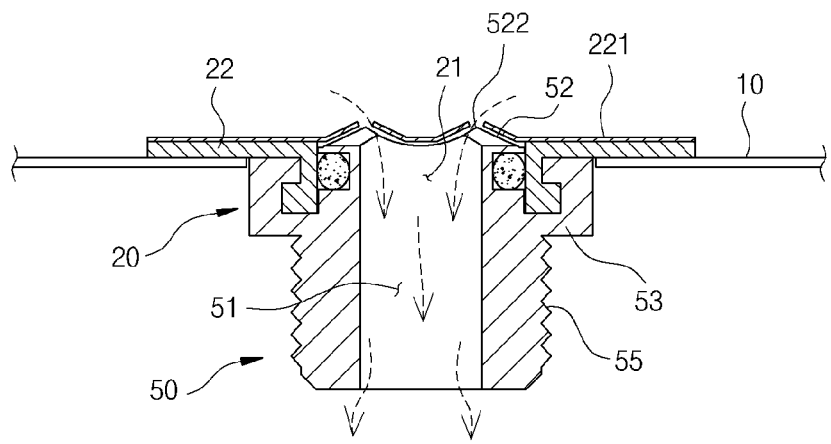

FIG. 7 is an exploded perspective view illustrating the pack according to another embodiment of the present invention, FIG. 8 is an exploded perspective view illustrating a coupling relationship between the plug and the connector illustrated in FIG. 7, FIG. 9 is a semi-sectional perspective view illustrating main parts of the pack illustrated in FIG. 7, and FIGS. 10 and 11 are views illustrating a procedure of coupling the connector to the plug when in use.

Referring to FIGS. 7 to 11, the pack, designated by reference numeral 2, according to the present embodiment includes the pack body 10, the plug 20, and the connector 50.

The pack body 10 according to the present embodiment is generally similar to the embodiment as illustrated in FIGS. 1 to 6. That is, fluid may be received in the pack body 10, and the mounting hole 11 may be formed in one side of the pack body 10.

On the other hand, the plug 20 and the connector 50 according to the present embodiment have different configurations from those of the pack illustrated in FIGS. 1 to 6.

The plug 20 is provided with the discharge opening 21 for entrance/exit of fluid. The plug 20 consists of the plug body 22 and the coupling piece 24. The discharge opening 21 is perforated in the center of the plug body 22 and the coupling piece 24.

The plug body 22 is affixed to the inner surface of the pack body 10. Alternatively, the plug body 22 may be affixed to the outer surface of the pack body 10. One surface of the plug body 22 is covered with a shield film 221 to close the discharge opening 21. The shield film 221 is a tearable thin film. To this end, the shield film 221 may be formed of a plastic material.

The coupling piece 24 is formed at the other surface of the plug body 22 and protrudes outward from the pack body 10 through the mounting hole 11. The coupling piece 24 has the guide grooves 241 circumferentially formed in the outer peripheral surface thereof.

The connector 50 is configured to tear the shield film 221 when coupled to the plug 20. The connector 50 has the passage 51 formed in a central region thereof for movement of fluid. The connector 50 consists of the connector body 53, the inserting piece 52, and the connecting piece 55.

The connector body 53 has a disc form, and the plurality of mounts 54 is arranged on one surface of the connector body 53 so as to be spaced apart from one another. Each mount 54 consists of the mount body 541 and the guide protrusion 542. The mount body 541 protrudes orthogonally from the connector body 53. Alternatively, the mount body 541 may take the form of a strip extending in a circumferential direction of the connector body 53. The guide protrusion 542 protrudes orthogonally from the inner surface of the mount body 541. The guide protrusion 542 may be inserted into the corresponding guide groove 241. Once the guide protrusion 542 is inserted into the guide groove 241, the connector body 53 is rotatable in a circumferential direction of the coupling piece 24, which ensures firm coupling between the connector body 53 and the coupling piece 24.

As illustrated in FIG. 11, the inserting piece 52 is formed at the center of one surface of the connector body 53. The inserting piece 52 may be inserted into the discharge opening 21 such that the tip thereof comes into contact with the shield film 221. In this case, a blade 522 is formed at the tip of the inserting piece 52 to allow the inserting piece 52 to tear the shield film 221. Alternatively, the blade 522 may be replaced by a sharply pointed edge. Once the shield film 221 is torn by the inserting piece 52, the inserting piece 52 enters the pack body 10 to open the discharge opening 21, thereby allowing the fluid received in the pack body 10 to be introduced into the passage 51.

The packing 56 is interposed between the outer peripheral surface of the inserting piece 52 and the inner peripheral surface of the discharge opening 21. The packing 56 serves to prevent the fluid received in the pack body 10 from leaking to between the inserting piece 52 and the inner peripheral surface of the discharge opening 21.

The connecting piece 55 is formed at the center of the other surface of the connector body 53. The drainage line 60 may be coupled to the connecting piece 55 to guide flow of fluid introduced into the passage 51.

Many features discussed in the embodiment as illustrated in FIGS. 1 to 6 may be applied to the present embodiment.

MODE FOR INVENTION

As described above, a related description has sufficiently been discussed in the above "Best Mode" for implementation of the present invention.

INDUSTRIAL APPLICABILITY

As described above, the present invention may be wholly or partially applied to a pack.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A pack comprising:
a pack body in which fluid is receivable;
a plug mounted to the pack body, the plug having a discharge opening that connects the interior of the pack body to the outside;
a lid located within the pack body, the lid being configured to close the discharge opening;
an elastic member located within the pack body, the elastic member serving to impart elasticity to the lid to allow the lid to close the discharge opening; and
a connector mounted to one side of the plug, the connector functioning to push the lid in a direction of opening the discharge opening and having a passage perforated therein,
wherein the plug includes:
a plug body fixed within the pack body;
a plurality of fixing pieces arranged on an edge of one surface of the plug body so as to be spaced apart from one another, the fixing pieces serving to secure the elastic member; and
a coupling piece formed at the other surface of the plug body to protrude outward from the pack body,
wherein the elastic member includes:
a fixing body secured to the fixing piece, the fixing body having a drain hole;
a pressure piece located at the center of the drain hole, the pressure piece serving to press the lid toward the discharge opening; and
a plurality of elastic ribs configured to connect the pressure piece and the fixing body to each other, the elastic ribs serving to impart elasticity to the pressure piece,
wherein the connector includes:
a connector body separably coupled to the coupling piece;
an inserting piece formed at one surface of the connector body, the inserting piece being inserted into the discharge opening to push the lid, thereby opening the discharge opening; and
a connecting piece formed at the other surface of the connector body, the connecting piece being configured so as to be coupled to a drainage line,
wherein the passage penetrates the interior of the inserting piece, the connector body, and the connecting piece, and
wherein the inserting piece has at least one inlet hole formed in a periphery thereof so as to be in fluid communication with the passage,
wherein the coupling piece has a guide groove circumferentially formed in a portion of an outer peripheral surface thereof,
wherein the connector body has a mount configured to be inserted into the guide groove, and
wherein the connector is separably coupled to the plug as the mount is inserted into the guide groove,
wherein the mount includes:
a mount body orthogonally formed at the connector body; and
a guide protrusion orthogonally protruding from one surface of the mount body so as to be inserted into the guide groove, and
wherein the guide groove includes a vertical groove and a horizontal groove.

2. The pack according to claim 1, further comprising a packing located between the inserting piece and a peripheral surface of the discharge opening.

* * * * *